United States Patent
Sagasaki et al.

(10) Patent No.: US 6,445,973 B1
(45) Date of Patent: Sep. 3, 2002

(54) PERSONAL COMPUTER-INCORPORATED NUMERICAL CONTROL APPARATUS, AND IMAGE TRANSFER METHOD FOR PERSONAL COMPUTER-INCORPORATED NUMERICAL CONTROL APPARATUSES

(75) Inventors: Masakazu Sagasaki, Tokyo; Syoji Oda, Aichi, both of (JP)

(73) Assignee: Mitsubishi Denki Kabushuki Kaisha, Tokyo (JP)

( * ) Notice: Subject to any disclaimer, the term of this patent is extended or adjusted under 35 U.S.C. 154(b) by 0 days.

(21) Appl. No.: 09/367,663
(22) PCT Filed: Jan. 12, 1998
(86) PCT No.: PCT/JP98/00069
§ 371 (c)(1),
(2), (4) Date: Sep. 17, 1999
(87) PCT Pub. No.: WO98/37467
PCT Pub. Date: Aug. 27, 1998

(30) Foreign Application Priority Data

Feb. 19, 1997 (JP) .............................................. 9-035336

(51) Int. Cl.⁷ .............................................. G06F 19/00
(52) U.S. Cl. ........................... 700/180; 700/83; 700/169
(58) Field of Search ............................. 700/83, 86, 87, 700/169, 174, 180, 181–185, 104; 345/473, 781, 778, 783–787, 541; 709/213, 331, 332

(56) References Cited

U.S. PATENT DOCUMENTS 6,101,425 A * 8/2000 Govindaraj et al. ........ 700/104

FOREIGN PATENT DOCUMENTS

| JP | 62-256006 | 11/1987 |
|---|---|---|
| JP | 63-131225 | 6/1988 |
| JP | 3-231305 | 10/1991 |
| JP | 4-65711 | 3/1992 |
| JP | 4-114231 | 4/1992 |
| JP | 4-235591 | 8/1992 |
| JP | 5-27819 | 2/1993 |
| JP | 6-242913 | 9/1994 |
| JP | 62-75585 | 9/1994 |
| JP | 6-332521 | 12/1994 |
| JP | 7-104984 | 4/1995 |
| JP | 8-16223 | 1/1996 |
| JP | 8-115115 | 5/1996 |
| JP | 8-335106 | 12/1996 |
| JP | 9-120352 | 5/1997 |

OTHER PUBLICATIONS

"Advanced Windows", Jeffrey Richter, published by Microsoft Corporation, 1995 pp. 450–451, Chinese edition.

* cited by examiner

Primary Examiner—Leo Picard
Assistant Examiner—Steven R. Garland
(74) Attorney, Agent, or Firm—Sughrue Mion, PLLC

(57) ABSTRACT

A screen shifting method in a numerical control apparatus which includes a personal computer, comprising the steps of registering screen display processing libraries DLL; reading out all of the registered screen display processing libraries DLL when starting a screen shift execution program into a memory managed by an OS; managing the location of each of the screen display processing libraries DLL with a screen management table according to a discrete ID code; accepting a screen shift request when the screen shift execution program MMI application main module has been started and selecting a required screen display processing library DLL corresponding to the specified ID code from data in the screen management table; and executing screen shift according to the selected screen display processing library DLL.

6 Claims, 15 Drawing Sheets

WHEN POWER IS ON

FIG.13

[PARAMETERS FOR SHAFT SPECIFICATION]

| # | | ⟨X⟩ | ⟨Z⟩ | · · · · · |
|---|---|---|---|---|
| 1 | Rapid | | | |
| 2 | Clamp | | | |
| 3 | Smgst | | | |
| 4 | Gotl | | | |
| 5 | Got1 | | | |

PERSONAL COMPUTER-INCORPORATED NUMERICAL CONTROL APPARATUS, AND IMAGE TRANSFER METHOD FOR PERSONAL COMPUTER-INCORPORATED NUMERICAL CONTROL APPARATUSES

TECHNOLOGICAL FIELD

The present invention relates to a personal computer incorporated type of numerical control apparatus and a screen shifting method in the personal computer incorporated type of numerical control apparatus. More particularly this invention speeds up the shifting of screens.

BACKGROUND ART

A personal computer incorporated type of numerical control apparatus edits a machining program or monitors numerical control operations in a man-machine interface processing section (called as an MMI processing section hereinafter) of a personal computer section (called as a PC section hereinafter), and analyzes and interpolates a machining program registered in a memory of a numerical control section (called as an NC section hereinafter) in the NC section, and outputs an instruction to a servo system of a machine tool according to a result of the processing.

FIG. 14 shows a general outline of a personal computer incorporated type of numerical control apparatus (called as a PC incorporated type of numerical control apparatus hereinafter). The PC incorporated type of numerical control apparatus has a NC section 10 which executes a machining program and a PC section 200 displays the screens, setting data or the like, and monitors the operations.

The NC section 10 comprises a machining program analyzing section 11, a memory 12, an interpolator 13, a shaft controller 14, a machine control signal processor 15, a ladder circuit section 16, a digital signal input circuit 17, a digital signal output circuit 18, a PC interface 20, and a dual-port RAM 50.

One shaft controller 14 is provided for every shaft although only one unit is shown in FIG. 14. A servo-amplifier 310 of a servomotor 300 for each shaft is connected to each of the shaft controllers 14.

The servomotor 300 has a pulse generator for position detection although it is not shown in FIG. 14. The servo-amplifier 310 has a positional loop by a position feedback signal from the pulse generator.

The PC section 200 comprises a BIOS (Basic I/O System) section 201, an operating system section (called as an OS section hereinafter) 202, a MMI processing section 250, and a NC interface 203, and is connected to a hard disk storage device (called as an external storage device hereinafter) 100 as well as to a control panel with a display 110 via an interface (not shown).

The MMI processing section 250 has a screen display processing section 260 and a data setting unit 280.

The control panel 110 has a display 111 such as a CRT or LCD, a data entry section 112 such as a keyboard, a power-ON switch 113, and a power-OFF switch 114.

The conventional type of PC incorporated type of numerical control apparatus is con figured as described above, and operations thereof will be described hereinafter.

In the PC incorporated type of numerical control apparatus, entry of a machining program is carried out by means of key operation of the data input section 112 by an operator.

The key-entered machining program is inputted into the MMI processing section 250 via the OS section 202. The machining program inputted into MMI processing section 250 is converted to data code by the data setting unit 280 so that the personal computer can recognizes the program, and the converted data code is written in the hard disk storage device 100 via the OS section 202 and at the same time is transmitted to the NC interface 203.

The NC interface 203 writes the machining program transmitted from the data setting section 280 in a prespecified address of the dual-port RAM 50 in the NC section 10, and turns ON a data-write completion flag.

The PC interface 20 in the NC section 10 monitors a data-write completion flag on the dual-port RAM 50, and reads the machining program written on the dual-port RAM 50 when the data-write completion flag is detected, and writes the machining program in a file system constructed in the memory 12. In this process, the PC interface 20 checks whether any code which can not be handled in the numerical control unit, for instance, code such as low-case alphabetic characters is present in the program or not. The machining program written in the hard disk storage device 100 serves as a backup data if the machining program registered on the memory 12 in the NC section 10 is corrupted.

The input machining program is displayed on the display 111 of the control panel 110 as follows. At first, the PC interface 20 reads the machining program registered on the memory 12, writes the program in a prespecified address of the dual-port RAM 50, and turns ON the data-write completion flag. The NC interface 203 monitors a data-write completion flag on the dual-port RAM 50, and reads the machining program written on the dual-port RAM 50 when the data-write completion flag is detected, and transfers the machining program to the screen display processing section 260 of the MMI processing section 250.

The screen display processing section 260 adds fixed display data or the like such as a screen title to the received machining program and outputs the data to the display 111 via the OS section 202, then the display 111 displays the data such as the machining program thereon.

A sequence of executing a machining program is explained here. The machining program analyzing section 11 reads a machining program from the memory 12 block by block, and analyzes the read out machining program to compute a position of an end point of each block. The interpolator 13 interpolates positions of end points, and distributes each program up to each position of the end point to a movement instruction per unit time of each movable shaft.

The movement instruction outputted by the interpolator 13 is converted to a movement instruction per unit time under the consideration of acceleration and deceleration according to an acceleration/deceleration pattern previously specified by the shaft controller 14, and outputted to the servo-amplifier 310 as a servo movement instruction.

The servo-amplifier 310 controls driving of the servomotor 300 attached to a machine tool not shown according to this servo movement instruction.

Furthermore, a machine output signal-indicating ON or OFF of a cutting lubricant is transmitted to a relay circuit of a machine control console not shown from a machine control signal processor 15 via a digital signal output circuit 18 to have an ON/OFF switch of the cutting lubricant or the like operate. A signal inputted from the machine side such as a dog switch is inputted from a digital signal input circuit 17 to the machine control signal processing section 15. The signal inputted into or outputted from the digital signal input circuit 17 and digital signal output circuit 18 as described above is processed in the machine control signal processor 15 via a ladder circuit section 16 for describing machine control therein, and a result of the processing or the like is transmitted to the interpolator 13.

Conventionally, when screen display is performed based on a graphical user interface (called as GUI hereinafter) in a multitask fashion in the PC section 200 of the PC incorporated type of numerical control apparatus, display of each screen is executed by an application program based on an execution type of file for each screen.

For example, when the PC section is based on "Windows" of Microsoft Inc., as shown by the reference numerals 500 and 501 in FIG. 15, discrete application programs "***screen.exe" and "000screen.exe" are provided in each screen.

Each of these exe-files is a discrete application program with a Document-View structure according to a structure of classes of "CFormView Class", "CDocument Class", and "CWinApp Class" provided by MFC (Microsoft Foundation Class Library) as Application framework library by Microsoft Inc, is given thereto with a function of a main frame window by a dynamic link library "screen shift common processing library (D11)" (shown by the reference numeral 503 in FIG. 15) based on "CFrameWnd Class" respectively, performs data transaction with the NC section 10 via a custom API library 510, and displays a screen with a window respectively.

In the conventional type of PC incorporated type of numerical control apparatus, screen display based on GUI such as a window in the PC section 200 is performed by an application program based on the execution type of file for each screen, therefore each application program has to be started and terminated each time screen shift is executed, and processing used for a plurality of screens with sub-windows such as a screen for displaying the coordinates is performed by a discrete application program. Therefore, object size of the MMI software as a whole becomes large, and a long time is required for application loading from an external storage device such as a hard disk storage device 100, which hinders speed up of screen shift.

In the PC section 200, when data such as coordinates, a movement speed, a rotation speed, and temperature updated continuously or periodically in the NC section 10 is displayed on the screen in the PC section 200 as modal data, conventionally, the PC section 200 issues a request for modal data registration for each data to the NC section 10, and the NC section 10 searches target data and sets the data in the dual-port RAM 50 as a response thereto, while the PC section 200 reads the data set in the dual-port RAM 50 for screen display therefore when a plurality of modal data is displayed in one screen, each of the modal data is displayed one by one with a time lag therebetween, so that the screen display takes a long time, which makes the response to the screen display slow.

Further, the offset of a tool or the like is not periodically updated, and when data such as parameters required for screen display is to be displayed on the screen, conventionally, the PC section 200 issues a screen data registration request for each data to the NC section 10, and the NC section 10 searches target data and sets the data in the dual-port RAM 50 as a response thereto, while the PC section 200 reads the data set in the dual-port RAM 50 for screen display, therefore when a plurality of screen data is displayed in one screen, each of the screen data is displayed one by one with a time lag therebetween, so that the screen display takes a long time.

The present invention has been made for solving the problems as described above, and it is an object of the present invention to obtain a screen shifting method in a personal computer incorporated type of numerical control apparatus for realizing high speed screen shift in GUI such as a window as well as a personal computer incorporated type of numerical control apparatus used for executing the screen shifting method, and also to obtain a personal computer incorporated type of numerical control apparatus with improved high speed screen display by executing screen display of modal data and screen data at a high speed with fast response.

DISCLOSURE OF THE INVENTION

To achieve the object described above, in a screen shifting method in a personal computer incorporated type of numerical control apparatus according to the present invention with a personal computer incorporated therein and having a numerical control unit for executing a machining program and a personal computer unit for editing the machining program or monitoring numerical control operations by the numerical control unit; the method comprising the steps of registering screen processing libraries each including an independent processing section for each screen for defining contents of display on each screen and contents of setting and management for data used by the numerical control unit and a common processing section for screen shift in each screen; reading out all of the registered screen processing libraries onto a memory managed by an operating system when starting a screen shift execution program; managing location of each of the screen processing libraries with a screen management table according to a discrete identification code; accepting a screen shift request in the situation where the screen shift execution program has been started and selecting a screen processing library corresponding to identification code specified in response to the screen shift request from data in the screen management table; and executing screen shift according to the selected screen processing library.

In the screen shifting method according to the present invention, screen shift can be executed at a high speed with a plurality of screen processing libraries and one screen shift execution file without starting or terminating an application program each time screen shift is executed.

Furthermore, screen shift is executed at a higher speed by temporarily raising a priority of execution of the application to the highest priority during screen shift.

In addition, to achieve the object as described above, a personal computer incorporated type of numerical control apparatus according to the present invention with a personal computer incorporated therein and having a numerical control unit for executing a machining program and a personal computer unit for editing the machining program or monitoring numerical control operations by the numerical control unit; the apparatus comprises a plurality of screen processing units for each screen registered as a library for each screen and including an independent processing section for each screen for defining contents of display on each screen and also contents of setting and management for data used by the numerical control unit and a common processing section for screen shift; a screen management table for managing location of the registered screen processing units according to an identification code; and a screen control unit for selecting a screen processing unit corresponding to the identification code specified in response to a screen shift request with the screen management table and instructing execution of screen shift with the selected screen processing unit.

In the personal computer incorporated type of numerical control apparatus according to the present invention, a screen processing unit is registered as one library for each screen, and the screen control unit selects a screen processing unit corresponding to ID code specified in response to a request for screen shift with the screen management table and instructs execution of screen shift with the selected screen processing unit.

In a personal computer incorporated type of numerical control apparatus according to another aspect of the present invention and also in the personal computer incorporated type of numerical control apparatus according to the above invention, the screen control unit initializes the screen management table in starting according to a screen management table definition file. The screen management table definition file is prepared in a text file format, so that the file can easily be modified with Notepad as a standard tool of Windows.

In this personal computer incorporated type of numerical control apparatus, a screen management table is initialized or reconstructed each time the screen control unit is started.

To achieve the object as described above, a personal computer incorporated type of numerical control apparatus according to the present invention with a personal computer incorporated therein and having a numerical control unit for executing a machining program and a personal computer unit for editing the machining program or monitoring numerical control operations by the numerical control unit; the apparatus comprises a shared memory accessible from both the numerical control unit and the personal computer unit with a modal information table defined therein; a modal data batch registering unit provided in the personal computer unit for reporting a request for batch registration of data such as coordinates to be updated continuously or periodically for each screen in the numerical control unit to the numerical control unit; and a modal information managing unit provided in the numerical control unit for collecting data for each screen continuously or periodically updated in response to a request from the modal data batch registering unit and setting the data in a modal information table in the shared memory; wherein the personal computer unit reads data set in the modal information table in the shared memory for each screen and executes processing for screen display.

In the personal computer incorporated type of numerical control apparatus according to the present invention, continuously or periodically updated data is set for each screen in the modal information table in the shared memory by the modal information managing unit in response to a request for batch registration of data from the modal data batch registering unit, and the personal computer unit reads the data set in the modal information table of the shared memory for each screen for screen display.

In a personal computer incorporated type of numerical control apparatus according to another aspect of the present invention, the personal computer incorporated type of numerical control apparatus according to the above invention further comprises a modal data batch canceling unit for reporting a request for canceling data registered by the modal data batch registering unit in batch by each screen to the numerical control unit; wherein the modal information managing unit deletes data set in the modal information table in the shared memory in batch in response to the request from the modal data batch canceling unit.

In the personal computer incorporated type of numerical control apparatus according to the present invention, the data set in the modal information table in the shared memory is deleted in batch in response to a data batch canceling request from the modal data batch canceling unit.

In addition, to achieve the object as described above, a personal computer incorporated type of numerical control apparatus according to the present invention with a personal computer incorporated therein and having a numerical control unit for executing a machining program and a personal computer unit for editing the machining program or monitoring numerical control operations by the numerical control unit; the apparatus comprises a screen data memory provided in the numerical control unit for storing therein data for the numerical control unit such as parameters required for screen display; a screen data registering unit provided in the personal computer unit for reporting a request for registering data for the numerical control unit for each screen in batch to the numerical control unit; a screen data batch reading unit provided in the personal computer unit for reporting a request for reading screen data specified on selection of a new screen in batch to the numerical control unit and reading the screen data in batch from the numerical control unit; and a screen data managing unit provided in the numerical control unit for storing data such as parameters required for screen display in response to the request from the screen data registering unit in the screen data memory, reading data from the screen data memory in response to the request from the screen data batch reading unit, and transmitting the data in batch to the screen data batch reading unit; wherein the personal computer unit executes the processing for screen display of the data transmitted to the screen data batch reading unit.

In the personal computer incorporated type of numerical control apparatus according to the present invention, the screen data registering unit stores data such as parameters required for each screen display in a screen data memory in response to a screen data registration request with the screen data registering unit, and the screen data batch reading unit reports a request for reading data specified on selection of a new screen in batch to the numerical control unit, so that data in the screen data memory is read in batch and the data is displayed on the screen.

BRIEF DESCRIPTION OF THE DRAWINGS

FIG. 10 is a flow chart showing a processing flow of screen data registration when power is ON.

FIG. 13 is an explanatory view showing an example of screen display.

BEST MODE FOR CARRYING OUT THE INVENTION

Figure 1:
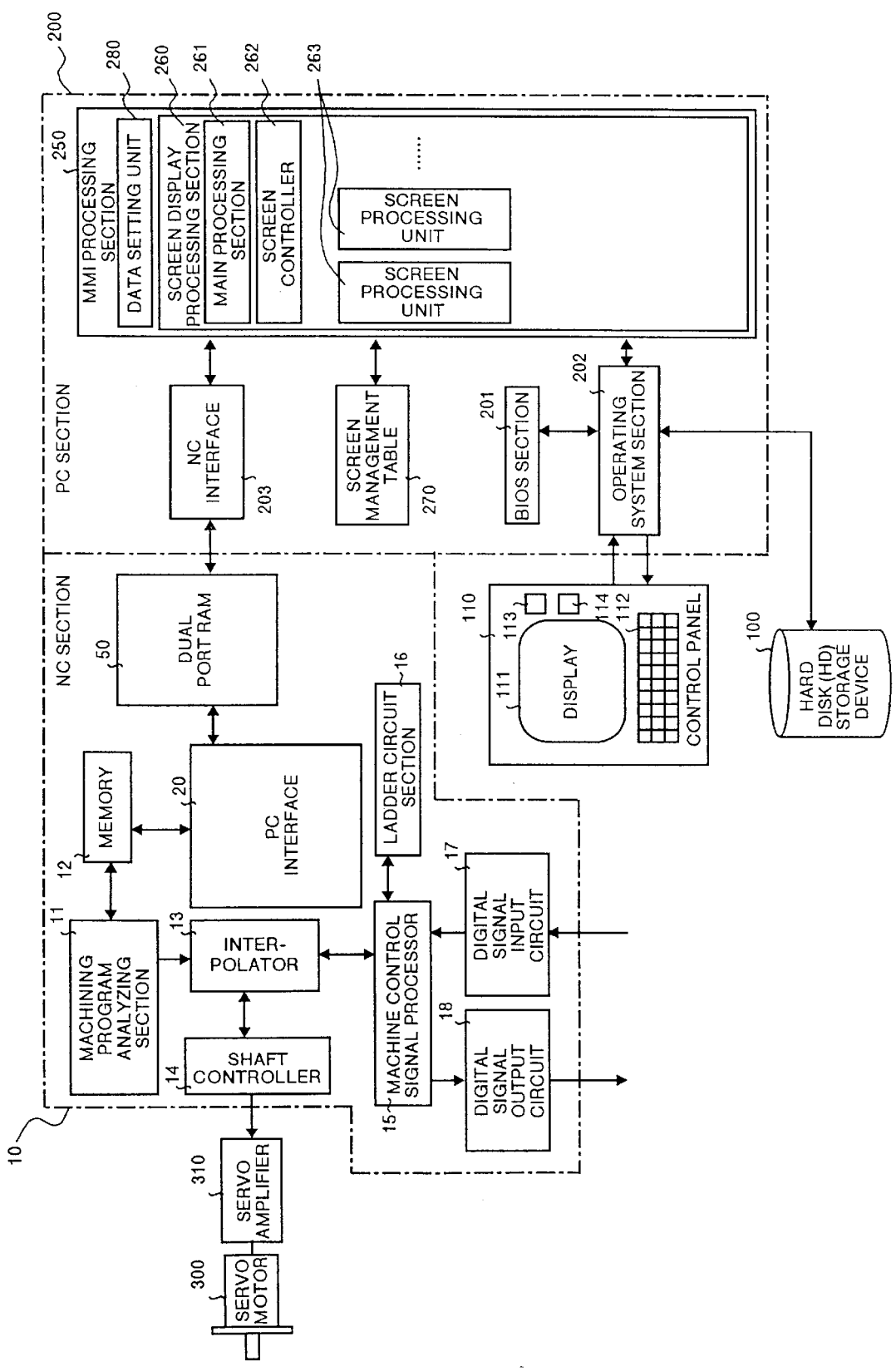
FIG. 1 is a block diagram showing Embodiment 1 of the personal computer incorporated type of numerical control apparatus according the present invention.

Detailed description is made hereinafter for embodiments of the personal computer incorporated type of numerical control apparatus and the screen shifting method in the personal computer incorporated type of numerical control apparatus according to the present invention with reference to the attached FIG. 1 to FIG. 13. In the embodiments of the present invention to be described hereinafter, the same reference numerals are assigned to components corresponding to those in the apparatus based on the conventional technology, and description thereof is omitted herein.

Embodiment 1

FIG. 1 shows Embodiment 1 of the personal computer incorporated type of numerical control apparatus according to the present invention. The operating system of the PC section 200 in the personal computer incorporated type of numerical control apparatus is "Windows" by Microsoft Inc. and terms and names used in "Visual C++", "MFC (Microsoft Foundation Class Library)", and "Windows" by Microsoft Inc. are used in the description hereinafter.

In the personal computer incorporated type of numerical control apparatus according to Embodiment 1, a screen display section 260 in the PC section 200 has a screen controller 262 as one execution module and a plurality of screen processing units 263 as libraries other than a main processing section 261 as an execution module. In addition, a screen management table 270 such as a RAM is provided in the PC section 200.

Each of the screen processing unit 263 is a library provided in each screen, and is, more specifically, a DLL (Dynamic Link Library) used in "Windows", which includes an independent processing section for each screen for defining contents of display on each screen and contents of setting and management for data used by the NC section 10 and a common processing section for screen shift.

Each of the screen control unit 262 is stored in a hard disk storage device 100 as a screen display processing DLL (screen processing library) in a file format, and the entire unit is read out onto a memory controlled by an operating system, herein by "Windows" by starting the screen control unit 262.

The screen management table 270 is initialized in starting of the screen control unit 262, and manages location of all of the screen processing units 263 read out (registered) onto the memory according to ID code (module handles).

Figure 2:
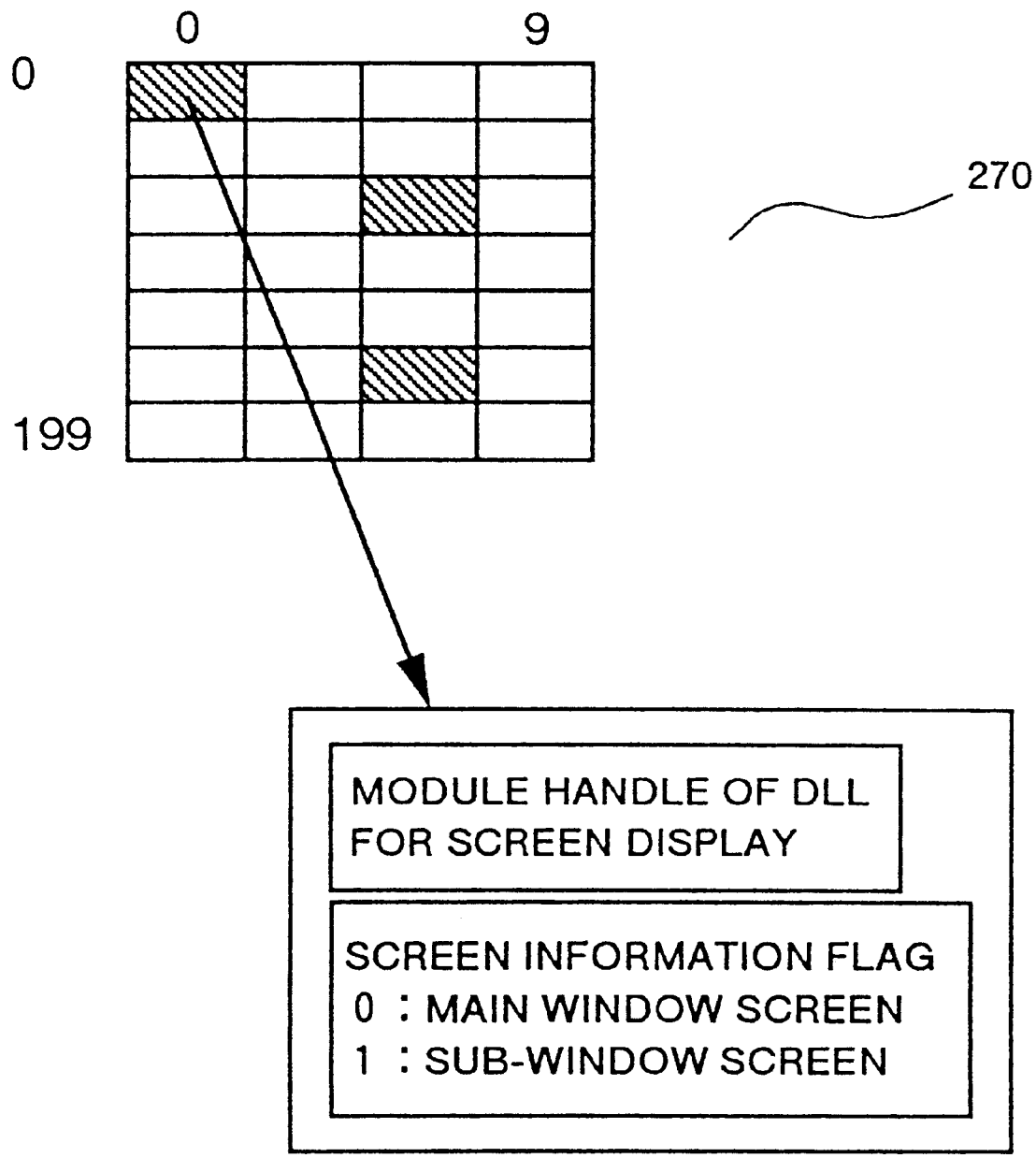
FIG. 2 is an explanatory view showing one example of a screen management table.

The screen management table 270 has a matrix form as shown in FIG. 2, and identifies a screen processing unit 263 according to a module handle specified by a row number and a column number. A screen information flag in addition to a module handle is described in each cell of the screen management table 270.

The screen information flag is used for specifying either of a main window screen and a sub-window screen, and a screen registered as a main window screen is always displayed as only one screen, therefore when a screen shift function is called, a specified window is displayed while the immediately preceding window is automatically closed. In contrast, for a screen registered as a sub-window screen, when a screen shift function is called, a specified window is displayed anew without closing the window on display.

The screen control unit 262 comprising a screen shift execution file (application program) accepts a screen shift request from the data entry section 112 or the like in starting, selects a screen processing unit 263 corresponding to ID code specified in response to the screen shift request with the screen management table 270, and instructs execution of screen shift by the selected screen processing unit 263.

Herein, the screen shifting method in the PC incorporated type of numerical control apparatus configured as described above comprises the steps of registering screen processing libraries (screen processing units 263) each including an independent processing section for each screen for defining contents of display on each screen and contents of setting and management for data used by the NC section and a common processing section for screen shift in each screen; reading out all of the registered screen processing libraries (screen display processing DLLs) in starting of a screen shift execution program (screen control unit 262) onto a memory managed by an operating system; managing location of each of the screen processing libraries with a screen management table 270 according to discrete ID code; accepting a screen shift request in the situation where the screen shift execution program has been started and selecting a screen processing library corresponding to ID code specified in response to the screen shift request from data (module handle) in the screen management table 270; and executing screen shift according to the selected screen processing library.

Figure 3:
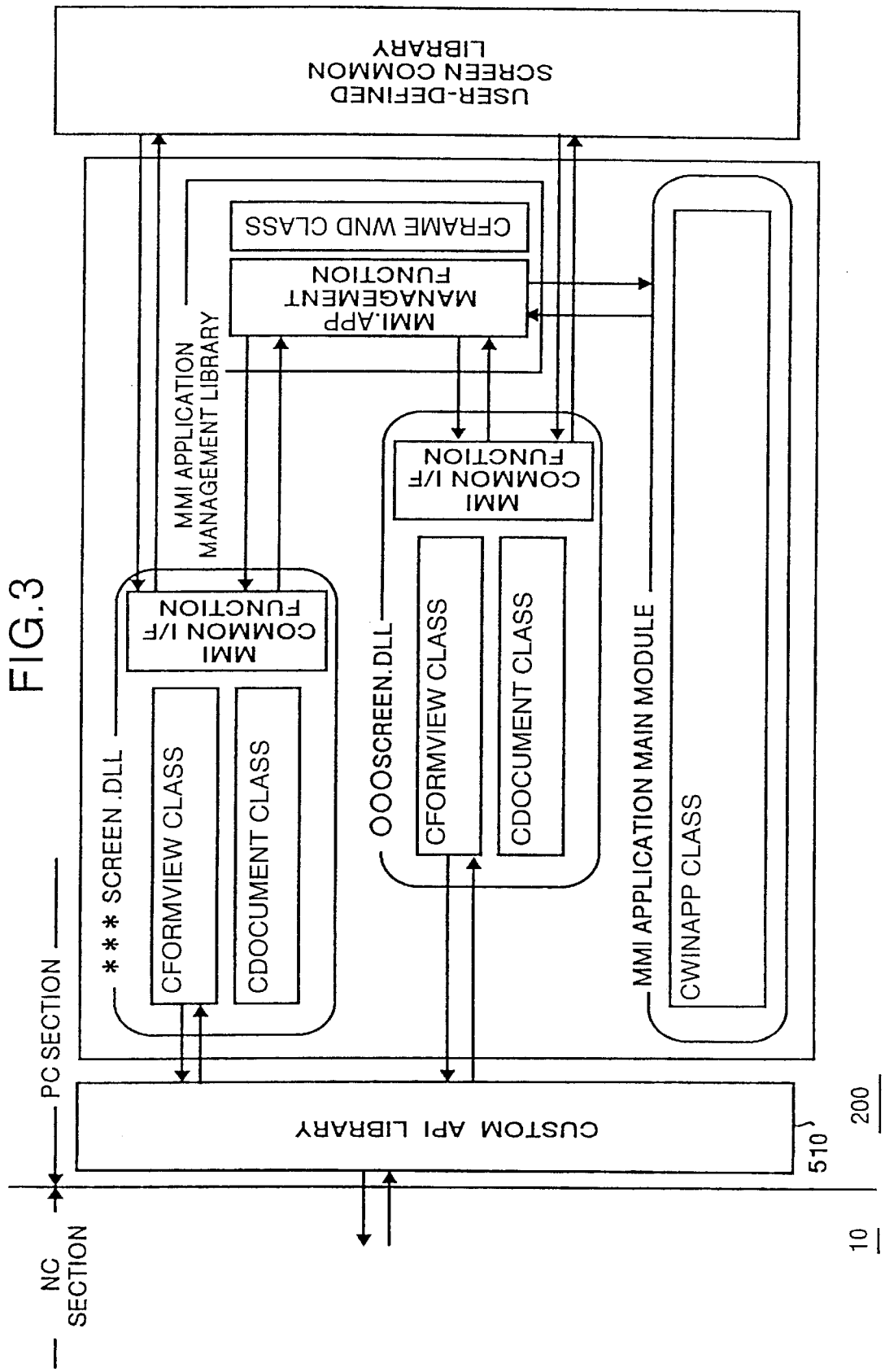
FIG. 3 is an explanatory view showing a file structure for the processing of screen shift in the personal computer incorporated type of numerical control apparatus according to the present invention.

FIG. 3 shows a file structure for the processing of screen shift in the PC incorporated type of numerical control apparatus according to the present invention. Herein, description is made for a case where two screens of "*screen" and "000screen" are displayed. This case includes "*screen.dll" as a DLL for "***screen", "000screen.dll" as a DLL for "00screen", "MMI application management library", "User-defined screen common library" based on user's option, and "MMI application main module".

"***screen.dll" and "000screen.dll" as the dynamic link libraries for screen display correspond to the screen processing units 263, each of which has functions of "CFormView Class" and "CDocument Class" as an independent processing section for each screen for defining contents of display on each screen and contents of setting and management for data used by the NC section 10, and also has a MMI common I/F function as a common processing section for screen shift, both of which form a common basic structure between the units.

"CFormView Class" is the base class used in views containing controls, and defines display contents (layout) such as dialog boxes created by the dialog editor.

"CDocument Class" provides a basic function of a user-defined document class, and supports standard operations such as creation of a new file of, reading, and saving data (document) used by an application.

"MMI application management library" has an MMI, App management function, and a function of "CFrameWnd Class", which defines a screen management table 270.

"CFrameWnd Class" provides a function of overlapping frame windows or a pop-up frame window of a SDI (single document interface) for Windows together with a member managing the windows and has a control function of a frame section (a title bar, a system menu, maximize and minimize buttons or the like) of a window.

"MMI application main module" corresponds to a screen controller 262, which has a function of "CWinApp Class".

"CWinApp Class" is the base class with Windows application objects derived therefrom, and provides member functions for performing initialization, execution and termination of Windows applications.

Configuration of a screen display processing DLL, processing in starting of "MMI application main module", and a sequence of screen shift is explained below with reference to FIG. 4 to FIG. 6.

Figure 4:
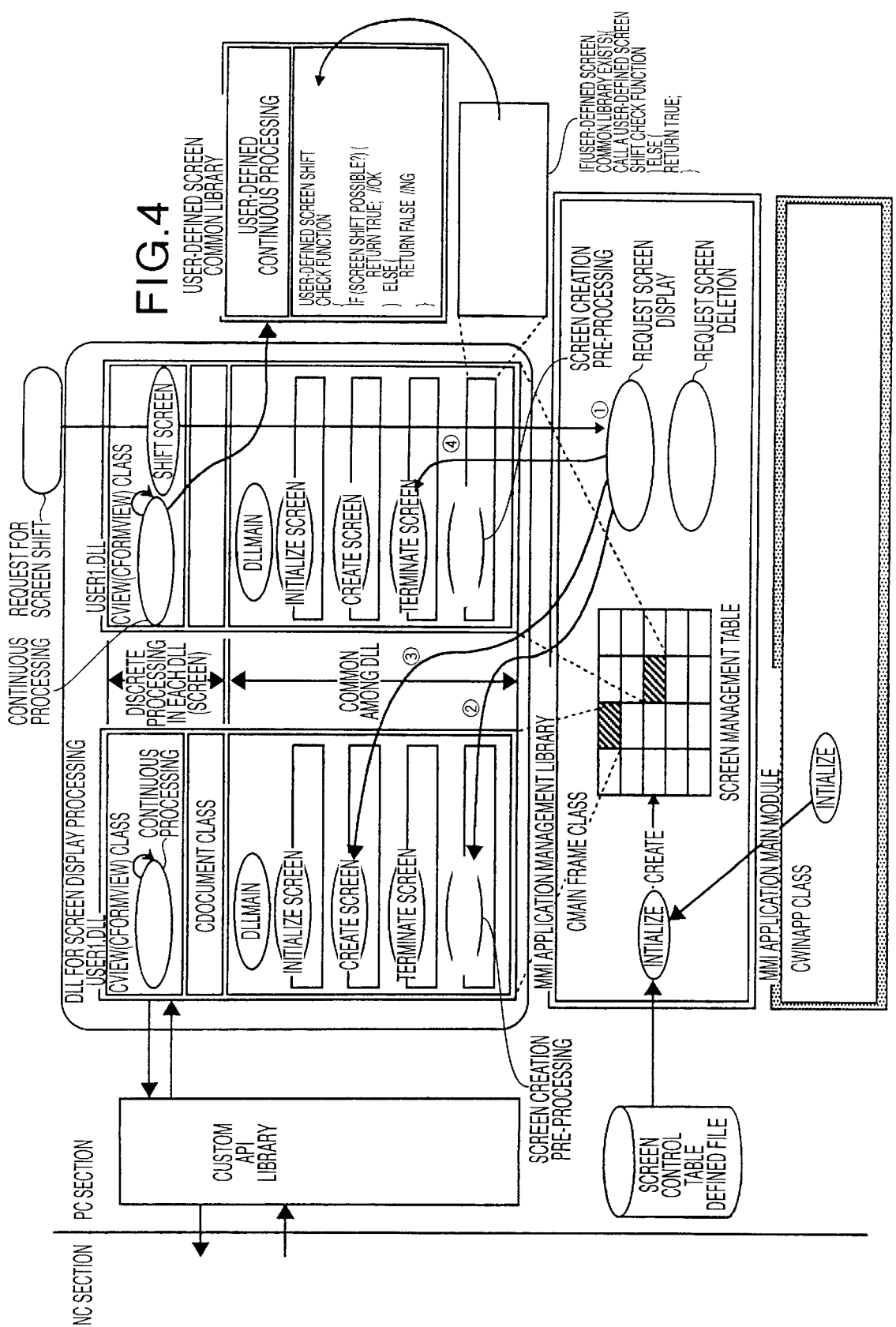
FIG. 4 is an explanatory view showing details of a DLL for processing of screen display.

In the case of FIG. 4, there are "User 1.dll" and "User 2.dll" as screen display processing DLLs, and each of those DLLs has a processing section specific to DLLs (screens) with the above mentioned "CFormView Class" and "CDocument Class", "DllMain" common among DLLs, and functions of "Initialize a screen", "Create a screen", "Terminate a screen", and "Screen creation pre-processing" respectively.

"Initialize a screen" is a function to be called from an initialization function of "MMI application management library" in starting of an application, namely in starting of "MMI application main module" for successively executing initialization of each screen, and by programming the processing required for initialization of each screen in this function, the processing for initialization specific to each screen is executed in starting.

"Create a screen" is called from "Request screen display" described later existing in the "MMI application management library" in response to a screen shift request, and displays a screen as a target to be shifted.

"Terminate a screen" is called from "Request screen deletion" described later existing in the "MMI application management library" in response to a screen shift request, and performs an operation of terminating screen display of a currently displayed screen, namely a screen before shifted.

"Screen creation pre-processing" is called immediately after execution of "Request screen display", the processing of screen creation is, according to determination of conditions for inhibiting screen creation, executed in a case of "TRUE" and the processing is interrupted without executing the processing of screen creation in a case of "FALSE". A screen shift check function is defined by the "User-defined screen common library" if the "User-defined screen common library" exists, and "Screen creation pre-processing" is executed by calling the screen shift check function from the "User-defined screen common library".

"MMI application management library" has functions of the above mentioned "CFrameWnd Class", "Request screen display", and "Request screen deletion".

"Request screen display" is executed by calling a DLL for processing of corresponding screen display, in other words, "Create a screen" as a DLL for the processing of displaying a screen as a shift-targeted screen to display a window specified by a screen management table number (ID code) in response to a screen shift request.

In this process, a priority of processing for the screen shift execution program is set to "the highest priority" by using "SetPriorityClass" in WindowsAPI at the initial stage of the processing for "Request screen display". The WindowsAPI is a generic name for a function group provided by "Windows" as the operating system.

Then, the priority of the processing for the screen shift execution program is set to the original status "Normal" by using the "SetPriorityClass" in the WindowsAPI at the end of the processing for "Request screen display".

"Request screen display" is executed by calling a DLL for processing of corresponding screen display, in other words, "Terminate a screen" as a DLL for processing of displaying a screen as an original screen before shifted to close a window specified by the screen management table number (ID code) in response to a screen shift request.

In this process, a priority of processing for the screen shift execution program is set to "the highest priority" by using the "SetPriorityClass" in the WindowsAPI at the initial stage of the processing for "Request screen deletion".

Then, the priority of the processing for the screen shift execution program is set to the original status "Normal" by using the "SetPriorityClass" in the WindowsAPI at the end of the processing for "Request screen deletion".

Figure 5:
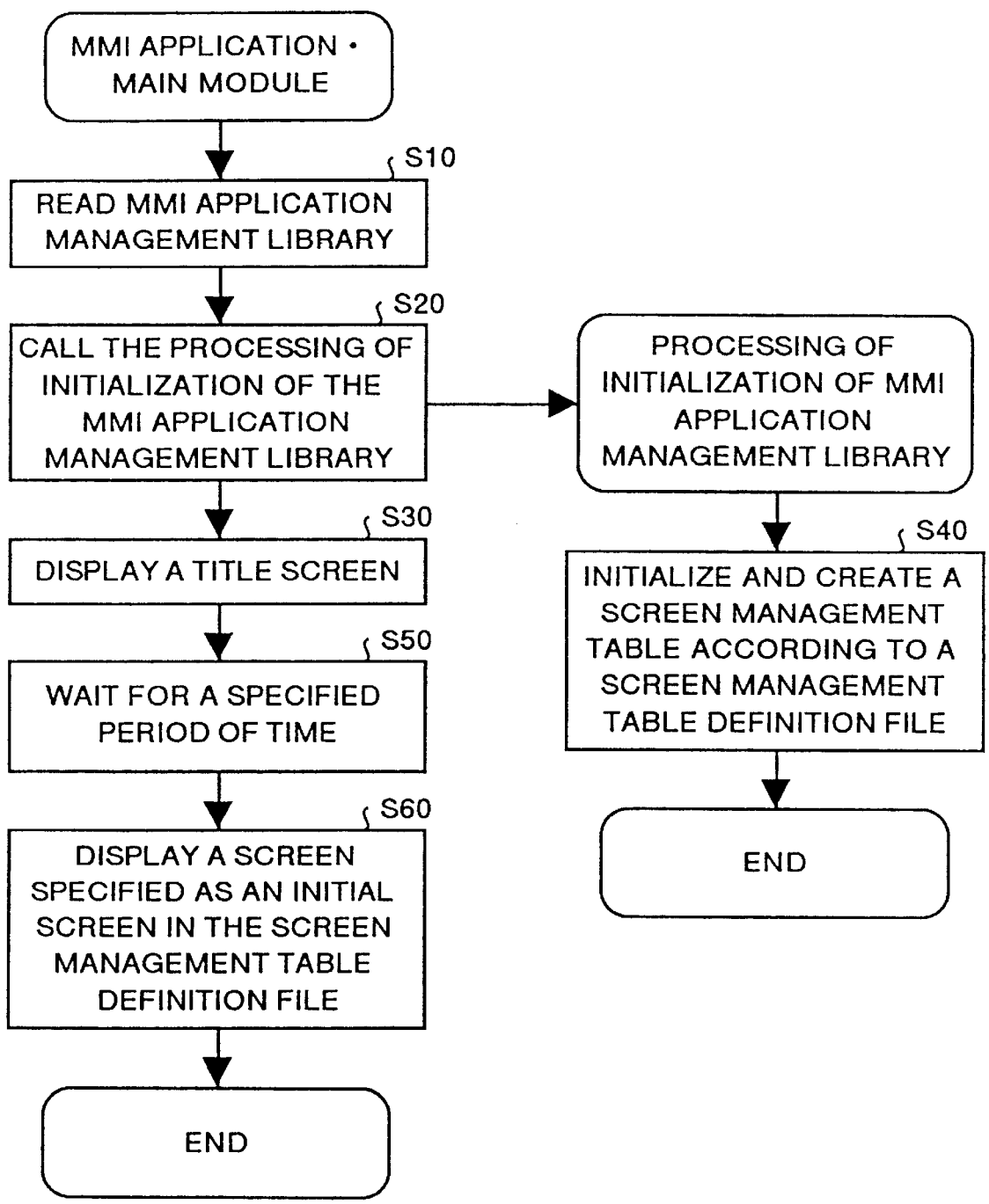
FIG. 5 is a flow chart showing the processing when starting can an application program for screen shift.

Next description is made for a routine of processing in starting of "MMI application main module" with reference to FIG. 5.

At first, the routine follows the steps of reading "MMI application management library" (step S10), and calling the initialization of "MMI application management library" (step S20). With this operation, a title screen is displayed (step S30).

Furthermore, concurrently when the processing of initialization in "MMI application management library" is called, the screen management table 270 is initialized and created based on "Screen management table definition file" in the routine of processing for "Initialization in MMI application management library" (step S40).

As the title screen display is continued for several seconds, the system control waits for a specified period of time (step S50), and then a screen specified as an initial screen in the screen management table definition file of the screen management table 270 is displayed (step S60).

Figure 6:
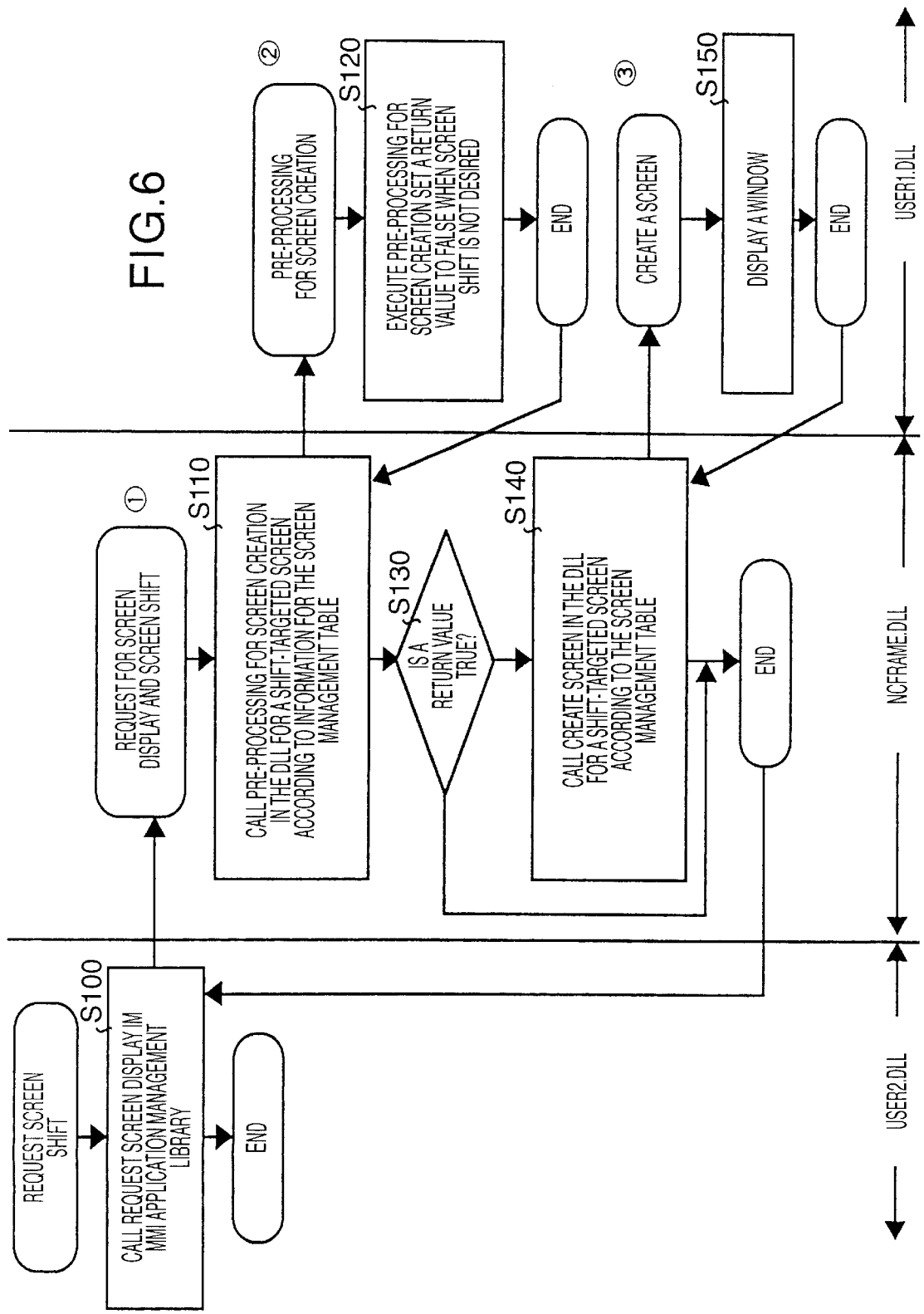
FIG. 6 is a flow chart showing a sequence of screen shift.

Next description is made for the processing of screen shift when screen display based on "User2.dll" is shifted to screen display based on "User1.dll" with reference to FIG. 6.

"Request screen display" in the "MMI application management library" is called in response to a screen shift request (step S100), (① in FIG. 4).

Then, a priority of processing for the screen shift execution program is set to "the highest priority" by using "SetPriorityClass" in the WindowsAPI at the initial stage of the processing for "Request screen display".

Then, "Screen creation pre-processing" as a DLL for processing of a shift-targeted screen display according to information for the screen management table (step S110), (② in FIG. 4).

After this step, the processing before screen shift is executed according to "Screen creation pre-processing" as the DLL for processing of the shift-targeted screen display (step S120). The processing follows the steps of calling the screen shift check function, setting a return value to "TRUE" when screen shift is executed, setting the return value to "FALSE" when screen shift is not desired, and returning the function to "MMI application management library".

Then, the return value is determined in "MMI application management library" (step S130). When it is determined that the return value is "FALSE", the processing of screen shift is terminated, but when the return value is "TRUE", "Create a screen" as the DLL for processing of displaying a screen as a shift-targeted screen is called according to information for the screen management table (step S140), (③ in FIG. 4).

Then, a window is displayed according to the processing of "Create a screen" as the DLL for processing of displaying a screen as a shift-targeted screen (step S150).

If an attribute of the DLL for displaying a shift-targeted screen is a main window screen, "Terminate a screen" of the DLL for the screen before shifted is called and display of the window as a target to be shifted is terminated.

Then, the priority of the processing for the screen shift execution program is set to the original status "Normal" by using the "SetPriorityClass" in the WindowsAPI at the end of the processing for "Request screen display".

In accordance with the processing of screen shift as described above, starting and termination of the application program are not generated each time screen shift is executed, which allows screen shift to be speeded up.

Embodiment 2

Figure 7:
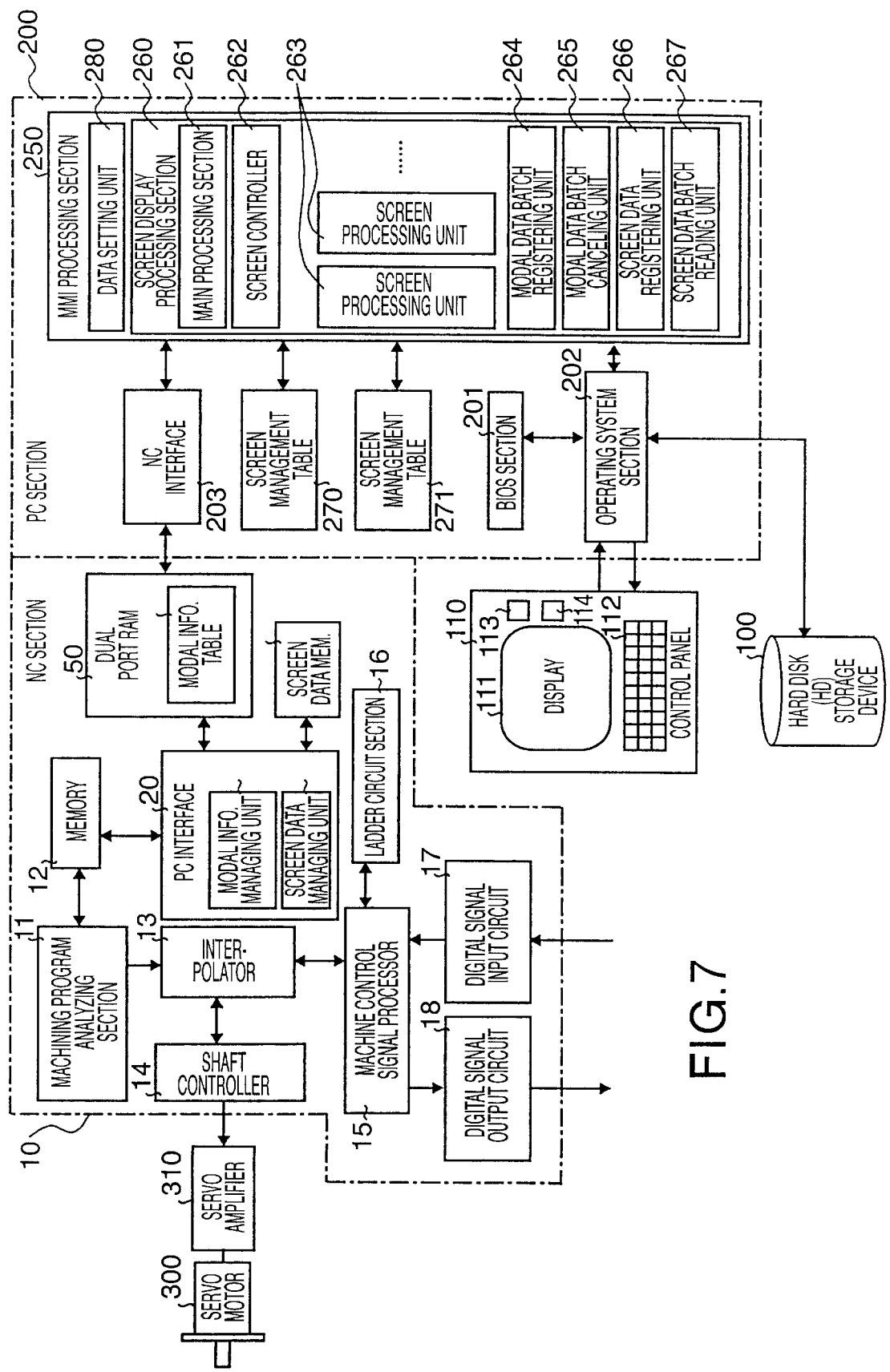
FIG. 7 is a block diagram showing Embodiment 2 of the personal computer incorporated type of numerical control apparatus according to the present invention.
Figure 8:
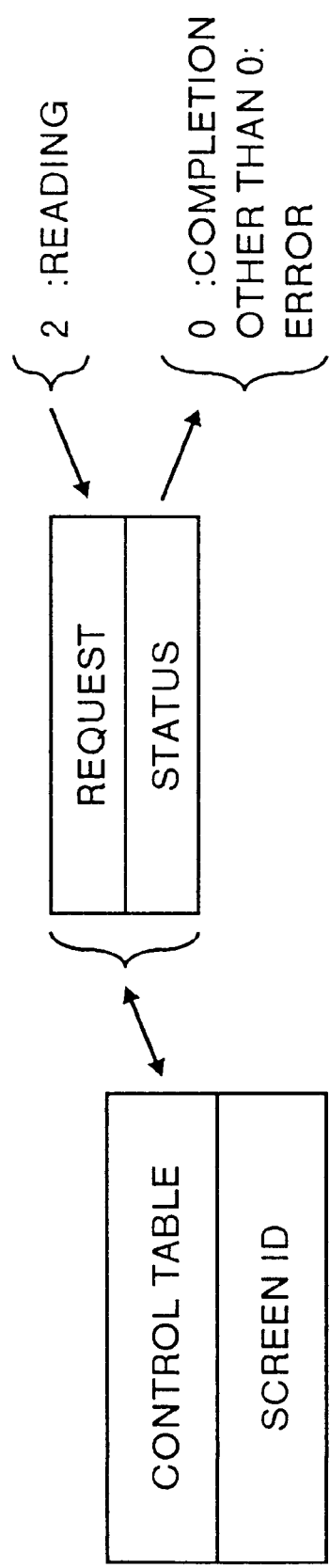
FIG. 8 is an explanatory view showing an example of reading screen data.

FIG. 7 shows Embodiment 2 of the personal computer incorporated type of numerical control apparatus according to the present invention. In FIG. 7, the same reference numerals are assigned to components corresponding to those in FIG. 1, and description thereof is omitted herein.

In this embodiment, a modal data batch registering unit 264, a modal data batch canceling unit 265, a screen data registering unit 266, and a screen data batch reading unit 267 are added to the screen display processing section 260 in the PC section 200, namely to the section described in Embodiment 1.

Provided in the PC interface 20 of the NC section 10 are a modal information managing unit 21 and a screen data managing unit 22, and a modal information table 51 is defined in the dual-port RAM (a shared memory accessible by both the NC section 10 and the PC section 200) 50. In addition, a screen data memory 30 for storing therein data in the NC section such as parameters required for screen display is provided in the NC section 10.

The modal data batch registering unit 264 reports a request for registering data such as the coordinates, a movement speed, and a rotation speed to be updated continuously or periodically in the NC section 10 for each screen in batch to the NC section 10 via the dual-port RAM 50.

The modal data batch canceling unit 265 reports a request for canceling the data registered by the modal data batch registering unit 254 for each screen in batch to the NC section 10 via the dual-port RAM 50.

The modal information managing unit 21 in the NC section 10 collects data updated continuously or periodically for each screen in batch in response to the request from the modal data batch registering unit 264, sets the data in the modal information table 51 of the dual-port RAM 50, and deletes the data set in the modal information table 51 of the dual-port RAM 50 in batch in response to the request from the modal data batch canceling unit 265.

The data set in the modal information table 51 of the dual-port RAM 50 as described above is displayed for each screen in batch at an arbitrary point of time. With this operation, screen display of modal data can be executed at a high speed with fast response.

The screen data registering unit 266 reports a request for registering data in the NC section 10 for each screen in batch to the NC section.

The screen data batch reading unit 267 reports a request for reading screen data specified on selection of a new screen in batch to the NC section 10 via the dual-port RAM 50, and reads the screen data from the NC section 10 in batch.

The screen data managing unit 22 in the NC section 10 stores data such as parameters required for screen display in response to a request from the screen data registering unit 266 in the screen data memory 30, reads data from the screen data memory 30 in response to a request from the screen data batch reading unit 267, and transmits the data in batch to the screen data batch reading unit 267.

The screen data managing unit 22 reflects, when contents of the memory 12 concerning screen data such as parameters are changed through entry with keys on the control panel 110, the changed contents onto the screen data memory 30.

The data transmitted to the screen data batch reading unit 267 as described above is displayed for each screen in batch at an arbitrary point of time.

With this operation, screen display of screen data can be executed at a high speed with fast response.

Figure 9:
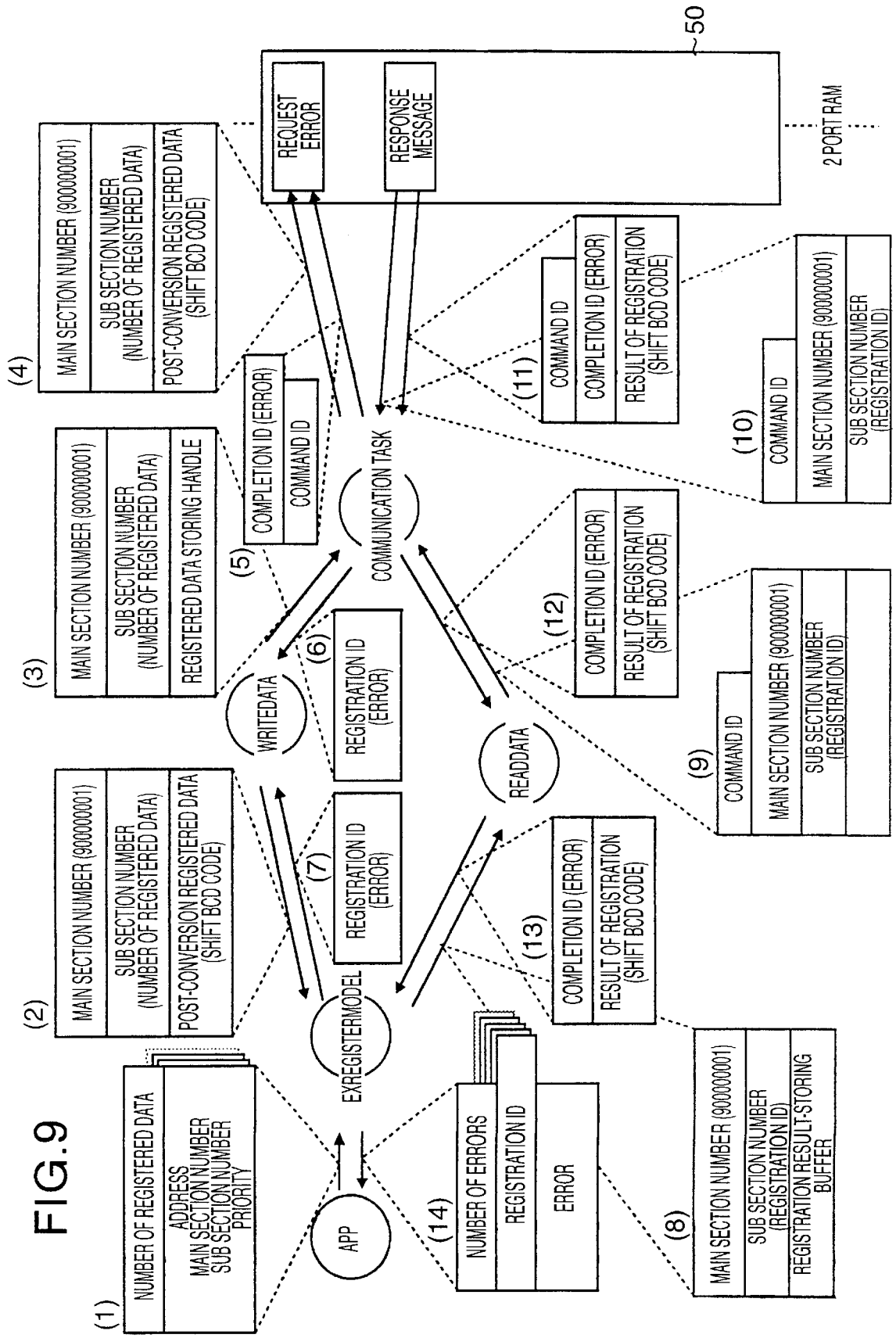
FIG. 9 is an explanatory view showing a process flow of modal data batch registration.

Next description is made for a sequence of processing for modal data batch registration/cancellation with reference to a process flow chart shown in FIG. 9.

1. Modal data batch registration (ExRegisterModal) comprises the steps of:

(1) Setting registered data to be read out at a high speed and a number of registered data as input data, and calling ExRegisterModal from an application.

(2) Converting the registered data to shift BCD code, and calling WriteData.

(3) WriteData adds a command ID to data sent from ExRegisterModal and transmits the data to a communication task.

(4) Writing a request message in a request message area on the dual-port RAM (2-port RAM) 50.

(5) When writing registered data is successfully ended, the command ID and a completion ID are returned. When it is unsuccessful, the command ID and Error Status are returned.

(6) Returning the registration ID to WriteData having called the communication task.

(7) Returning the registration ID to ExRegisterModal having called WriteData. When Error Status is returned, ExRegisterModal terminates the processing.

(8) Setting the registration ID in a subsection number, and calling ReadData.

(9) ReadData adds a command ID to data sent from ExRegisterModal and transmits the data to a communication task.

(10) Writing a request message in the request message area on the dual-port RAM 30.

(11) When reading a result of registration is successfully ended, the command ID and a completion ID are returned. When it is unsuccessful, the. command ID and Error Status are returned.

(12) Returning the registration ID and the result of registration to ReadData having called the communication task.

(13) Returning the completion ID and the result of registration to ExRegisterModal having called ReadData. When Error Status is returned, ExRegisterModal terminates the processing.

(14) Returning a result of a converted result of registration (shift BCD code) and a number of data that could not be registered to the application.

2. Modal data batch cancellation (ExCancelModal) comprises steps of:

(1) In modal data batch cancellation, setting a registration ID as input data instead of the registered data in (1) described above, and calling ExCancelModal.

(2) ExCancelModal converts, similarly to ExRegisterModal, the registration ID to shift BCD code, and calls WriteData. At this point of time, [900000000] is set in a main section number.

(3) The processing after (3) and on is the same as that in ExRegisterModal.

(4) Output data from the NC section 10 after the step (11) and on becomes a result of cancellation of registration. Therefore, a result of cancellation of registration is also outputted for the data outputted in the step (14).

Figure 10:
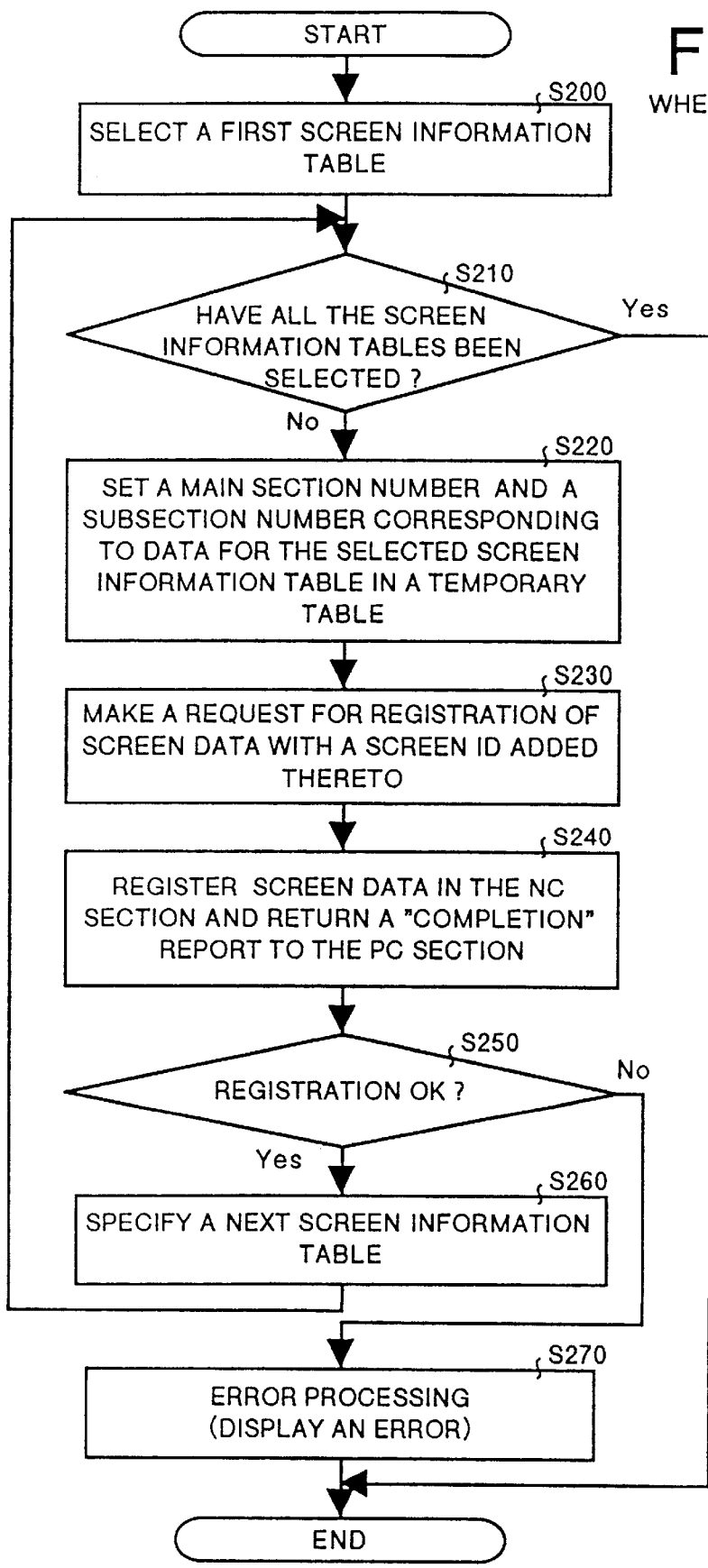

FIG. 10 shows a processing flow for registering screen data in the NC section 10 when power is ON.

At first, after initialization of a screen information table 271, an initial screen information table 2, namely the initial screen information table 2 set in the screen information table 271 for each screen is selected (step S200). Main section numbers and subsection numbers corresponding to identifiers of parameters displayed on each screen are registered in the screen information table 271. Then, whether all the screen information tables 271 have been selected or not is checked (step S210), and the main section number and subsection number registered in the selected screen information table 271 are set in a temporary table (step S220).

Figure 12:
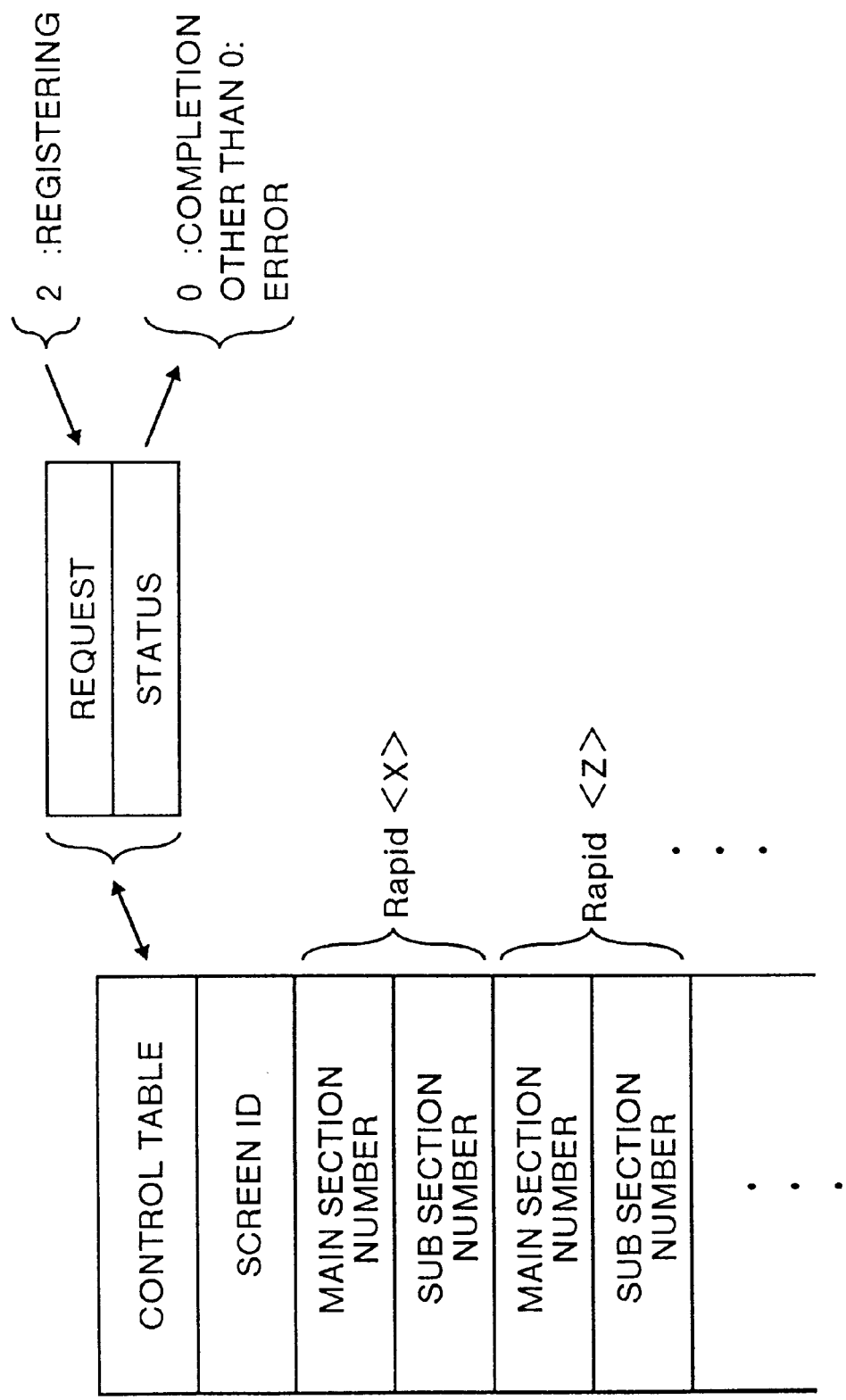
FIG. 12 is an explanatory view showing an example of registration of screen data.
Figure 14:
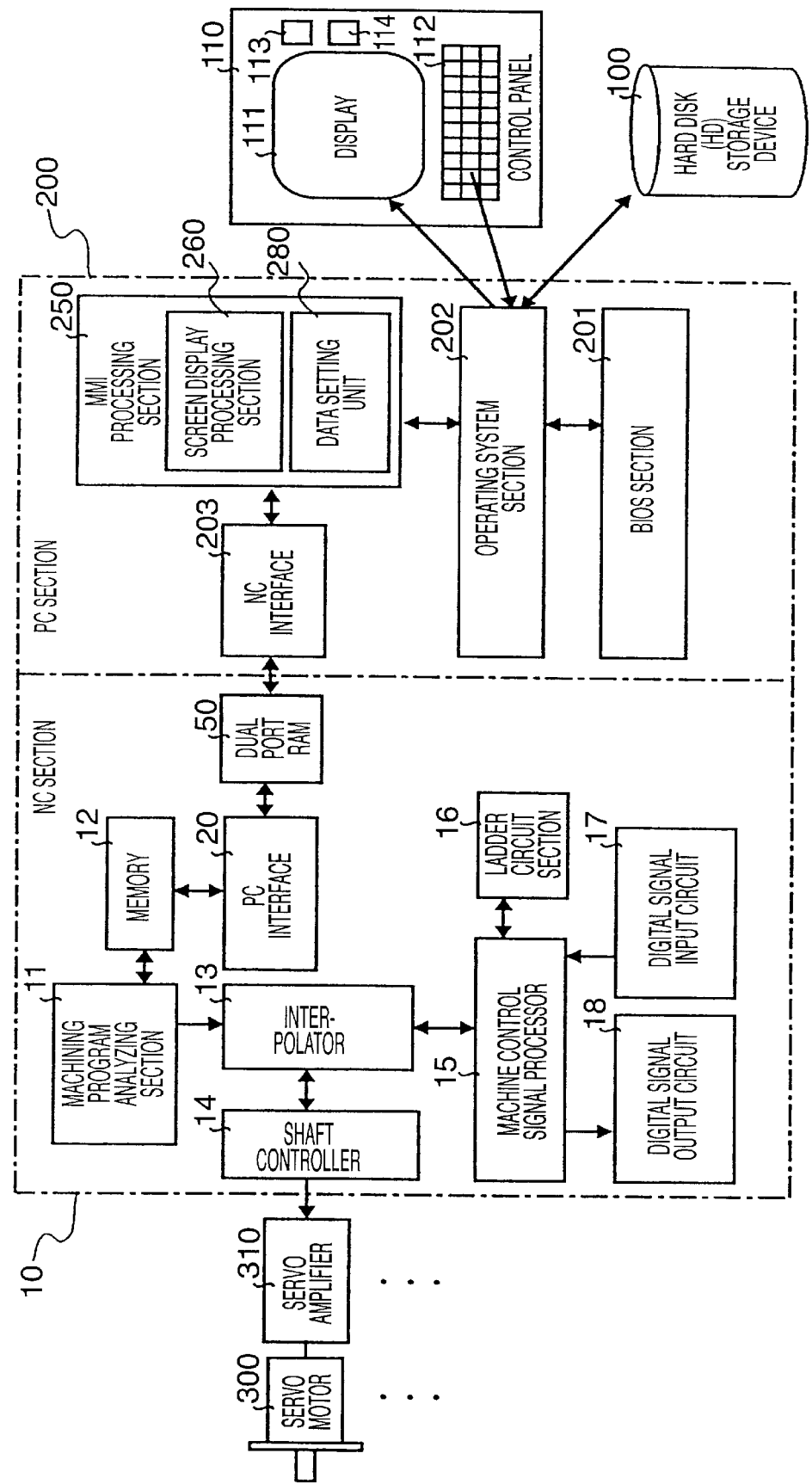
FIG. 14 is a block diagram showing the personal computer incorporated type of numerical control apparatus based on the conventional technology.
Figure 15:
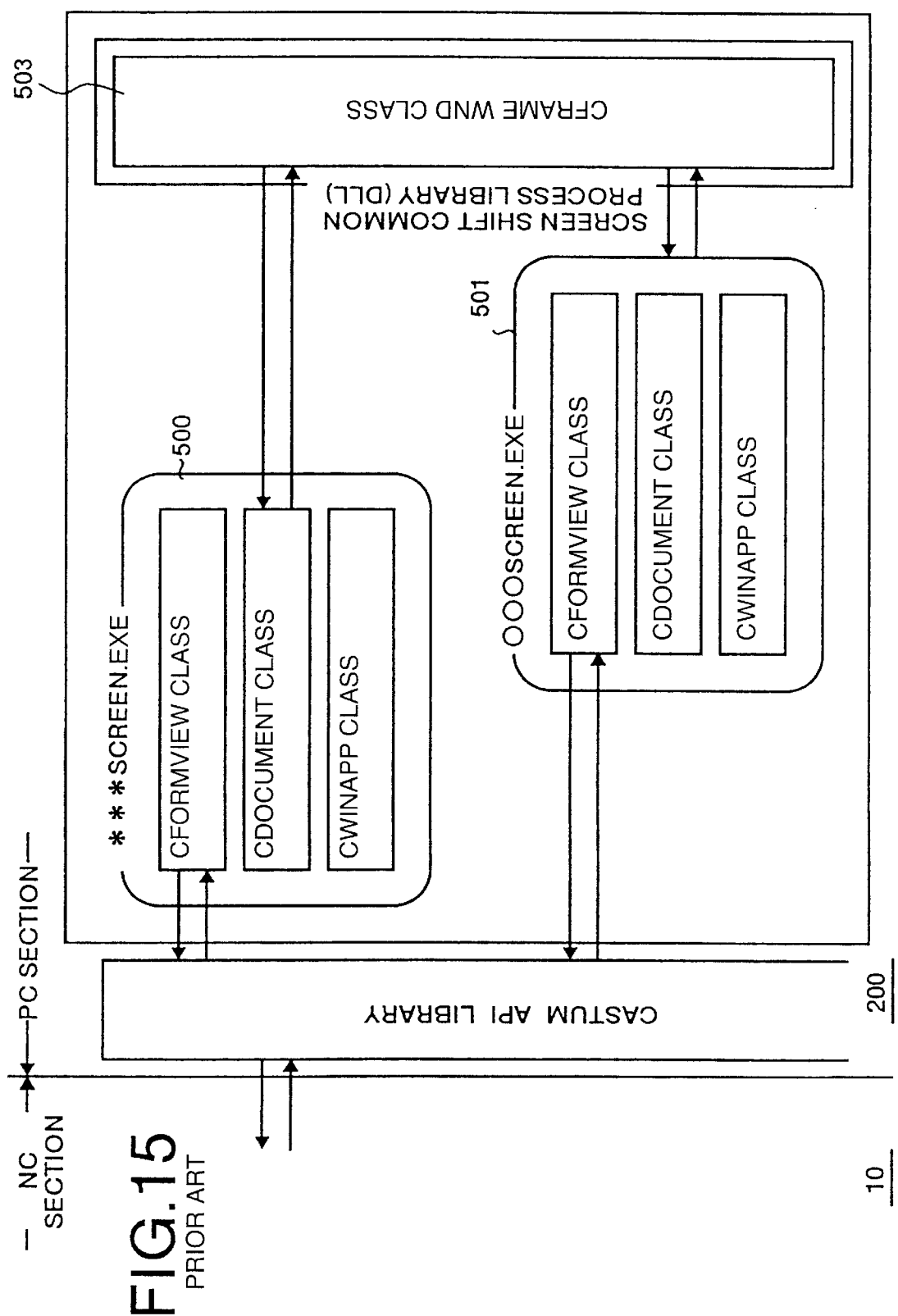
FIG. 15 is a view showing a file structure for processing of screen shift in the personal computer incorporated type of numerical control apparatus based on the conventional technology.

Then, as shown in FIG. 12, a screen ID is added to the screen data, "1" indicating "registered" is set in request data of a control table, and a screen data registration request is made (step S230).

Then, the screen data managing unit 22 in the NC section 10 analyzes the main section numbers and subsection numbers to register screen data in the screen data memory 30, and returns a "completion" report to the PC section 200 (step S240). When the registration is successfully ended, namely when status data for the control table in FIG. 12 is "0" (step S250, Yes), the screen data managing unit 22 specifies a next screen information table 271 (step S260) and the system control is returned to step S210, and the processing from steps S220 to step S260 until all the screen information tables 271 are specified.

When the registration is not successfully ended, namely when the status data for the control data in FIG. 12 is other than "0" (step S250, No), the screen data managing unit 22 stops registration of screen data to perform error processing (Error display) (step S270), and terminates the registration routine of screen data.

Figure 11:
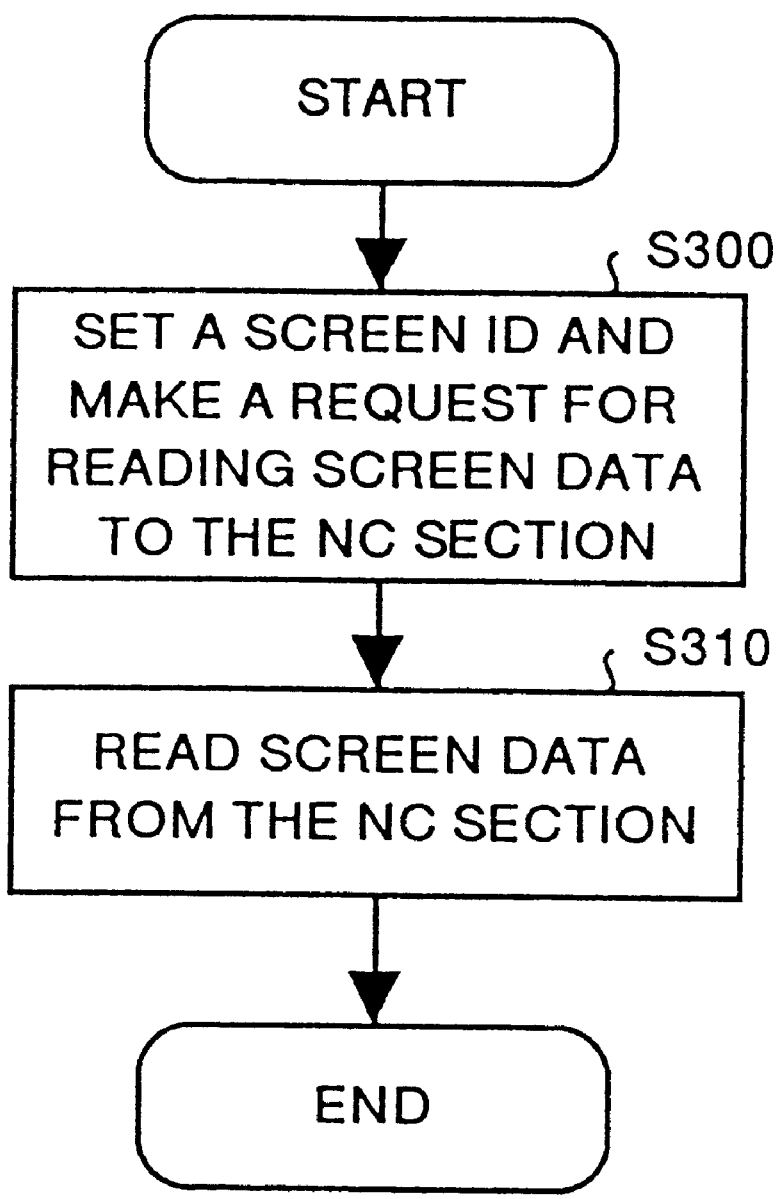
FIG. 11 is a flow chart showing a reading routine of screen data when a screen has been selected.

FIG. 11 shows a reading routine of screen data when a screen is selected. To read screen data, the screen data batch reading unit 267 first sets the screen ID used on registration of the screen data, sets "2" indicating "reading" in the control table shown in FIG. 8, and issues a screen data reading request to the screen data managing unit 22 of the NC section 10 via the dual-port RAM 50 (step S300).

Then, the screen data managing unit 22 reads screen data corresponding to the screen ID in batch and makes a report to that effect to the screen data batch reading unit 267 via the dual-port RAM 50 (step S310).

FIG. 12 shows an example of registration of screen data, while FIG. 13 shows an example of screen display.

As understood from the description above, with the screen shifting method in the personal computer incorporated apparatus of numerical control unit according to the present invention, high speed screen shift can be executed with a plurality of screen processing libraries and one screen shift execution file without starting or terminating an application program each time screen shift is executed.

With the personal computer incorporated type of numerical control apparatus according to another aspect of the present invention, a screen processing unit is registered as one library for each screen, and a screen control unit selects a screen processing unit corresponding to ID code specified in response to a screen shift request with the screen management table and instructs execution of screen shift by the selected screen processing unit thereto, so that high speed screen shift can be executed with a plurality of screen processing units and one screen control unit without starting or terminating an application program each time screen shift is executed.

With the personal computer incorporated type of numerical control apparatus according to another aspect of the present invention, a screen management table is initialized or reconstructed each time the screen control unit is started, so that high speed screen shift can be executed without occurrence of any trouble even if a screen processing unit is changed.

With the personal computer incorporated type of numerical control apparatus according to another aspect of the present invention, continuously or periodically updated data is set in a screen batch in the modal information table of a shared memory by a modal information managing unit in response to a data batch registration request from a modal data batch registering unit, and a PC section reads the data in a screen batch set in the modal information table of the shared memory and displays the data on the screen, so that display of modal data for each screen can be executed at a high speed with fast response.

With the personal computer incorporated type of numerical control apparatus according to the present invention, the data set in a modal information table in a shared memory is deleted in batch in response to a data batch canceling request from a modal data batch canceling unit, so that display of unnecessary modal data for each screen can be canceled at a high speed.

With the personal computer incorporated type of numerical control apparatus according to another aspect of the present invention, a screen data registering unit stores data such as parameters required for displaying each screen in a screen data memory in response to a screen data registration request with the screen data registering unit, and a screen data batch reading unit reports a request for reading data specified on selection of a new screen in batch to a NC section, so that data in the screen data memory is read in batch and the data is displayed on the screen, so that data display for each screen can be executed at a high speed.

INDUSTRIAL APPLICABILITY

The present invention as described above is suitable for being used in the personal computer incorporated type of numerical control apparatus.

We claim:

1. A screen shifting method in a numerical control apparatus with a personal computer incorporated therein and having a numerical control unit for executing a machining program and a personal computer unit for editing the machining program or monitoring numerical control operations by said numerical control unit; said method comprising the steps of:

registering screen processing libraries, each screen processing library including an independent processing section for defining contents of display on each screen and contents of setting and management of data used by the numerical control unit, and a common processing section for performing a screen shift;

reading out all of the registered screen processing libraries into a memory managed by an operating system when starting a screen shift execution program;

managing a location of each of the screen processing libraries with a screen management table, according to a discrete identification code;

accepting a screen shift request when the screen shift execution program has been started and selecting a screen processing library corresponding to the identification code specified in response to the screen shift request, based on data in the screen management table; and executing the screen shift according to the selected screen processing library.

2. A numerical control (NC) apparatus with a personal computer incorporated therein, said NC apparatus having a numerical control unit for executing a machining program and a personal computer unit for editing the machining program or monitoring numerical control operations by said numerical control unit; said NC apparatus comprising:

a plurality of screen processing units for each screen, each of the plurality of screen processing units being registered as a library for each screen and including an independent processing section for defining contents of a display on each screen and also contents of setting and management of data used by said numerical control unit, and a common processing section for performing a screen shift;

a screen management table for managing a location of the registered screen processing units, according to an identification code; and a screen control unit for selecting a screen processing unit corresponding to the identification code specified in response to a screen shift request, according to the screen management table, and instructing execution of the screen shift by the selected screen processing unit.

3. The apparatus according to claim 2, wherein said screen control unit initializes the screen management table.

4. The apparatus according to claim 2, wherein said screen shift processing unit has a function for executing a screen shift execution program with a highest priority of execution, during the screen shift.

5. A numerical control (NC) apparatus with a personal computer incorporated therein, said NC apparatus having a numerical control unit for executing a machining program and a personal computer unit for editing the machining program or monitoring numerical control operations performed by said numerical control unit; said NC apparatus further comprising:

a screen data memory provided in said numerical control unit for storing therein data for said numerical control unit;

a screen data registering unit provided in said personal computer unit for reporting a request to register data in said numerical control unit for each screen, in batch, to the NC unit;

a screen data batch reading unit provided in said personal computer unit for reporting a request to read screen data specified on selection of a new screen, in batch, to said numerical control unit and reading the screen data in batch from said numerical control unit; and a screen data managing unit provided in said numerical control unit for storing data, in response to the request from said screen data registering unit, in said screen data memory, reading data from said screen data memory in response to the request from said screen data batch reading unit, and transmitting the data in batch to said screen data batch reading unit; wherein said personal computer unit executes the processing for screen display of the data transmitted to said screen data batch reading unit.

6. The apparatus according to claim 5, wherein the data includes parameters required for screen display.

* * * * *

UNITED STATES PATENT AND TRADEMARK OFFICE
CERTIFICATE OF CORRECTION

PATENT NO. : 6,445,973 B1
DATED : September 3, 2002
INVENTOR(S) : Masakazu Sagasaki and Syoji Oda It is certified that error appears in the above-identified patent and that said Letters Patent is hereby corrected as shown below:

Title page, Item [54] and Column 1, lines 1-5,
Please delete Title of invention "PERSONAL COMPUTER-INCORPORATED NUMERICAL CONTROL APPARATUS, AND IMAGE TRANSFER METHOD FOR PERSONAL COMPUTER-INCORPORATED NUMERICAL CONTROL APPARATUS" and insert -- PERSONAL COMPUTER INCORPORATED TYPE OF NUMERICAL CONTROL APPARATUS AND SCREEN SHIFTING METHOD IN THE PERSONAL COMPUTER INCORPORATED TYPE OF NUMERICAL CONTROL APPARATUS --

Title page,
Item [73], please delete the Assignee "Mitsubishi Denki Kabushuki Kaisha" and insert -- Mitsubishi Denki Kabushiki Kaisha --

Signed and Sealed this

Thirtieth Day of September, 2003

JAMES E. ROGAN
*Director of the United States Patent and Trademark Office*